No. 788,678. PATENTED MAY 2, 1905.
J. G. SIMPSON.
DOUGH RAISING APPARATUS.
APPLICATION FILED FEB. 4, 1904.
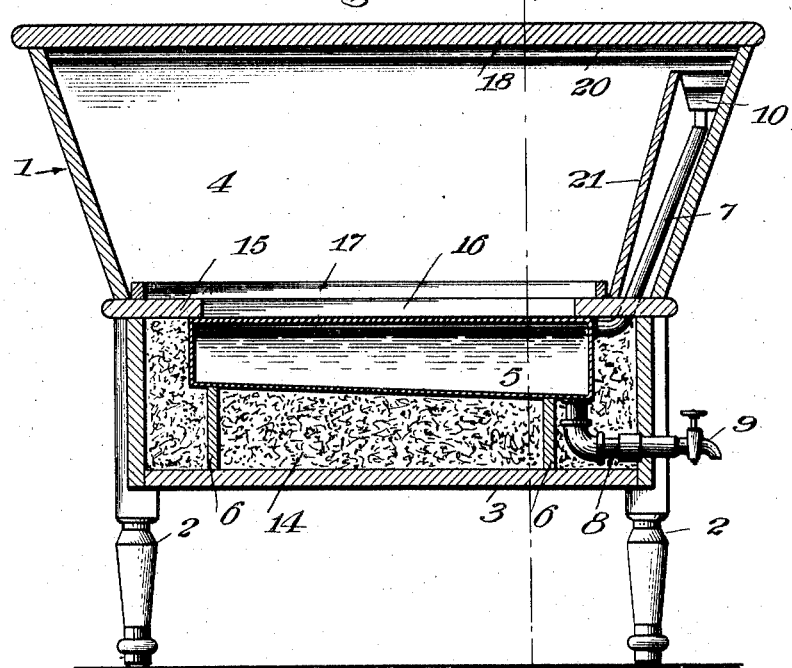
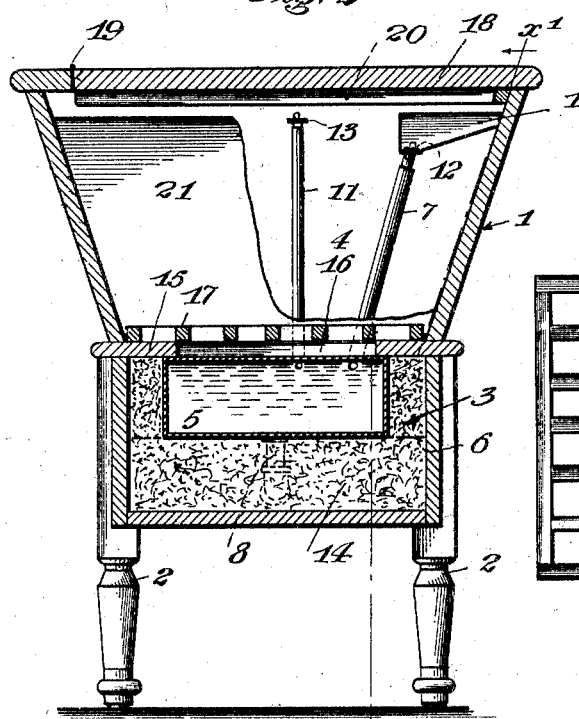
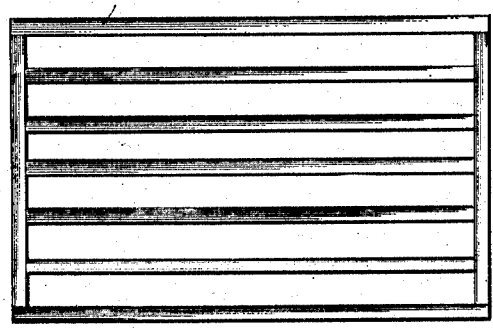
WITNESSES
INVENTOR
James G. Simpson
by Townsend Bros
His attys No. 788,678. Patented May 2, 1905.

UNITED STATES PATENT OFFICE.

JAMES G. SIMPSON, OF LOS ANGELES, CALIFORNIA.

DOUGH-RAISING APPARATUS.

SPECIFICATION forming part of Letters Patent No. 788,678, dated May 2, 1905.

Application filed February 4, 1904. Serial No. 191,937.

*To all whom it may concern:*

Be it known that I, JAMES G. SIMPSON, a citizen of the United States, residing at Los Angeles, in the county of Los Angeles and State of California, have invented a new and useful Dough-Raising Apparatus, of which the following is a specification.

The object of this invention is to provide means for raising dough and similar products in a convenient and reliable manner.

The present practice of setting the dough to raise where it will get the heat from the stove or other heater is often inconvenient and unreliable, as there is nothing definite about the quantity or duration of the supply of heat. There may be too much heat, causing the dough to raise too much, or the supply of heat may be too limited in amount or may give out altogether, with the result that the dough is not raised sufficiently. My invention provides for application of heat to the dough with certainty and uniformity which practically insures the proper raising of the dough.

The accompanying drawings illustrate the invention.

Figure 1 is a longitudinal section of the apparatus on line $x'\,x'$ in Fig. 2. Fig. 2 is a transverse section on line $x^2\,x^2$ in Fig. 1. Fig. 3 is a plan of the removable perforate false bottom for the dough-raising chamber.

The apparatus comprises a case or box 1, supported in any suitable manner—for example, by legs 2. This case is formed with two chambers 3 4. The upper chamber 4 constitutes the receptacle for the dough or other material to be raised and the lower chamber 3 is provided with means for supplying heat to the upper chamber. Such means preferably comprises a tank or vessel 5, suitably mounted by supports 6 in the lower chamber and provided with an inlet or supply pipe 7 for water or other heating medium and an outlet-pipe 8, provided with a valve or cock 9, for draining off such medium, said pipe 8 leading from the bottom of tank 5. At the top of pipe 7 may be provided a funnel 10 to enable water to be poured more readily into the pipe 7. An air-duct or outlet-pipe 11 may lead upwardly from the top of tank 5 to permit egress of air as it is displaced by the incoming water. Plugs or stoppers 12 13 may be provided at the tops of pipes 7 and 11 to close the same and prevent the escape of heat therefrom.

The tank 5 is preferably surrounded by heat-insulating packing 14, filling the space between said tank and the walls of the case.

The top of the lower compartment 3 of the case is partly covered by the partition between the two compartments which forms a flange 15 around the edge thereof, leaving an opening 16, through which the heat from the tank 5 may pass upwardly into compartment 4. Tank 5 is preferably closed at the top, and being of greater area than the opening 16 it rests against the under side of flange 15. The perforate false bottom or slatted frame 17 rests on the flange 15 and serves as a support for the dough-containing receptacles.

The top of compartment 4 is closed by a lid or cover 18, preferably hinged to the case at 19. Said lid has a bead 20 on its under side, which makes a close joint with the inside of the case at the top of compartment 4.

21 designates a screen-board placed at one end of compartment 4 to partition off the water-inlet and air-outlet pipes 7 11 from the main body of the compartment. The said pipes 7 and 11 extend upwardly from the top of tank 5 into the upper compartment 4, so that when the lid 18 is closed it covers these pipes as well as the main body of the compartment.

The apparatus is used as follows: The lid or cover 18 being lifted and stoppers 12 and 13 being removed, hot water at a certain definite temperature—for example, boiling water—is poured through funnel 10 and pipe 7 into the receptacle or tank 5. Said receptacle having been thus filled the receptacle or receptacles containing the dough to be raised are placed on the false bottom 17, and stoppers 12 13 and lid 18 are closed. Assuming this to be done in the evening the apparatus will be left over night, giving a long continued even heat, which will raise the dough in the proper manner. The dough may then be taken out, kneaded, and put in the cooking-pans, and may then be placed again in the compartment 4. The previous supply of water having been drawn out at outlet 18, the tank will be filled with a new supply of hot water.

What I claim, and desire to secure by Letters Patent of the United States, is—

1. In a dough-raising apparatus, a case containing two compartments, one above the other and having an open partition therebetween, a pan of a greater area than said opening supported in the lower compartment with its top engaging with the partition around said opening, packing around said pan, a frame over said opening, means for supplying said pan with hot water and removing the same therefrom, and a cover for the top compartment.

2. In a dough-raising apparatus, a case containing two compartments one above the other and having an open partition therebetween, a closed-topped hot-water pan in the lower compartment, means for supporting the top of said pan against the under side of the partition around said opening, packing around the pan, a discharge-pipe from the pan through the packing to the outside of the vessel, a frame in the upper compartment over said opening, a partition in said upper compartment, a supply-pipe and an air-vent in the upper compartment to one side of said last-mentioned partition and communicating with the top of the pan, a funnel for said supply-pipe, and a cover for the said upper compartment.

3. A dough-raising apparatus, comprising a case with upper and lower compartments, a tank in the lower compartment provided with water inlet and outlet pipes, a valve for the outlet-pipe, and an air-duct leading from the upper part of said tank.

4. A dough-raising apparatus, comprising a case with upper and lower compartments, the upper compartment provided with a hinged lid, the lower compartment containing a tank, a flanged outlet-pipe leading from the bottom of said tank, and a water-inlet pipe leading upwardly from said tank into the upper compartment and having a funnel at its upper end.

5. A dough-raising apparatus, comprising a case with upper and lower compartments, a tank in the lower compartment, water inlet and outlet means for said tank, a perforate false bottom at the top of the lower compartment, and a lid at the top of the upper compartment.

In testimony whereof I have signed my name to this specification, in the presence of two subscribing witnesses, at Los Angeles, in the county of Los Angeles and State of California, this 27th day of January, 1904.

JAMES G. SIMPSON.

In presence of—
ARTHUR P. KNIGHT,
JULIA TOWNSEND.